United States Patent
Mifune et al.

(10) Patent No.: US 8,068,197 B2
(45) Date of Patent: Nov. 29, 2011

(54) LIQUID CRYSTAL DISPLAY DEVICE

(75) Inventors: Masayuki Mifune, Mobara (JP); Nobuyuki Suzuki, Ohara (JP)

(73) Assignee: Hitachi Displays, Ltd., Chiba (JP)

( * ) Notice: Subject to any disclaimer, the term of this patent is extended or adjusted under 35 U.S.C. 154(b) by 196 days.

(21) Appl. No.: 12/683,484

(22) Filed: Jan. 7, 2010

(65) Prior Publication Data
US 2010/0182535 A1 Jul. 22, 2010

(30) Foreign Application Priority Data

Jan. 19, 2009 (JP) .................. 2009-009252
Mar. 19, 2009 (JP) .................. 2009-068219
Mar. 19, 2009 (JP) .................. 2009-068221

(51) Int. Cl.
*G02F 1/1335* (2006.01)
(52) U.S. Cl. ............... 349/67; 349/62; 349/65
(58) Field of Classification Search ............ 349/62, 349/66, 77
See application file for complete search history.

(56) References Cited

U.S. PATENT DOCUMENTS

2005/0195340 A1* 9/2005 Lazarev .............. 349/62
2008/0030651 A1* 2/2008 Shibata .............. 349/65

FOREIGN PATENT DOCUMENTS

JP 7-43710 9/1995
JP 2005-251687 9/2005

* cited by examiner

*Primary Examiner* — Phu Vu
(74) *Attorney, Agent, or Firm* — Antonelli, Terry, Stout & Kraus, LLP.

(57) ABSTRACT

A liquid crystal display device including a thin light guide plate and capable of preventing light leakage from light sources is provided. The light guide plate is formed of a sheet. On a back face of the light guide plate, a first projection and a second projection that protrude outwardly and a reflection face provided between the first projection and the second projection are provided. The light sources are disposed on a side face of the light guide plate. A light entering portion is disposed on the side face where the light source is provided. A thin film portion is included between the light sources adjacent to each other in the light entering portion.

8 Claims, 16 Drawing Sheets

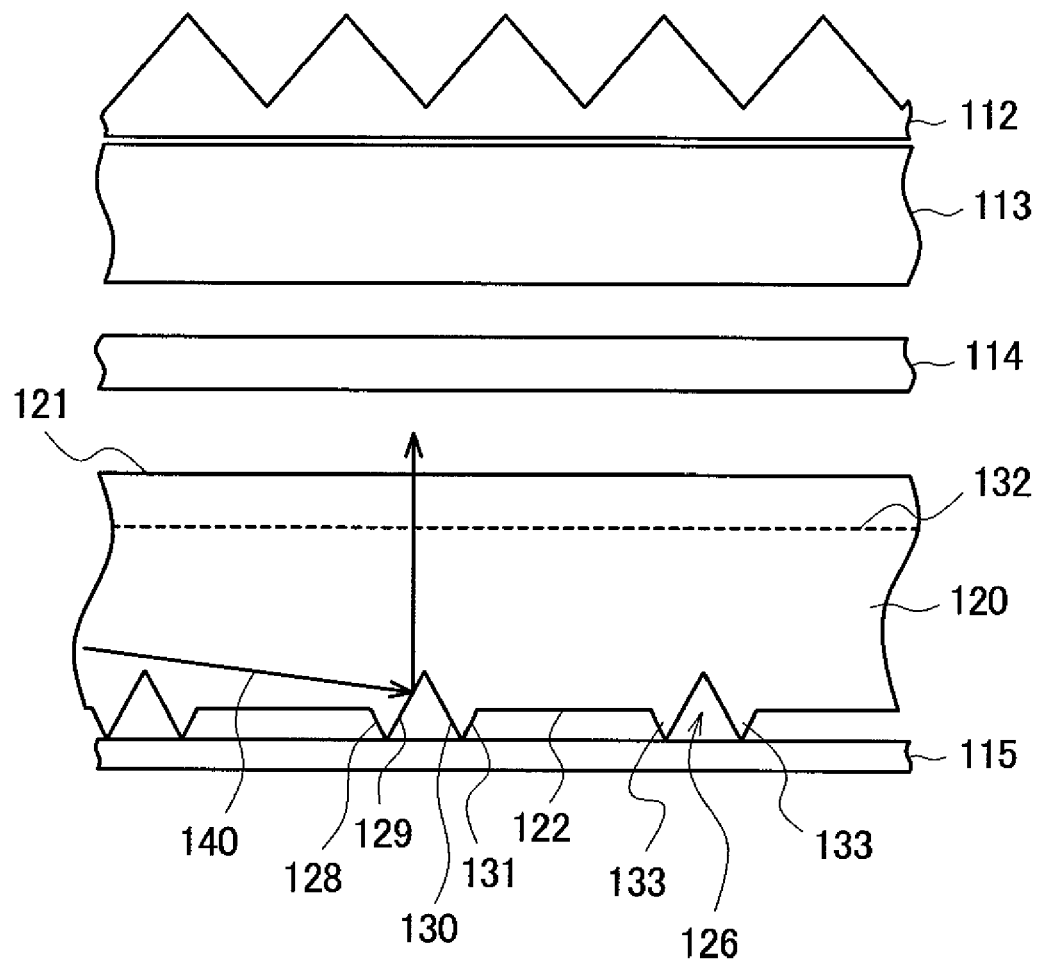

LIQUID CRYSTAL DISPLAY DEVICE

CROSS-REFERENCE TO RELATED APPLICATION

The present application claims priority from Japanese application JP 2009-009252 filed on Jan. 19, 2009, the content of which is hereby incorporated by reference into this application.

BACKGROUND OF THE INVENTION

1. Field of the Invention

The present invention relates to a liquid crystal display device.

2. Background Art

In recent years, liquid crystal display devices are widely used as information display devices of mobile equipment. For miniaturizing the mobile equipment, liquid crystal display devices are required to reduce the entire thickness.

On the other hand, since liquid crystal display devices are not self-luminous, a planar lighting unit called a backlight is required in many cases. In the liquid crystal display device used for mobile equipment, a method has been known in which a light source is provided on the side face of a light guide plate as a planar lighting unit for reducing the thickness of a backlight. In such a planar lighting unit, an appropriate structure is provided for the light guide plate for uniformly scattering light introduced from the side face to the front face. In the planar lighting unit, it must be noted that unnecessary light should not reflect in the screen.

For example, JP-A-7-43710 discloses a liquid crystal display device in which a plurality of grooves having protrusions that protrude outwardly on both ends of an opening are provided on the surface of a light guide plate. In the liquid crystal display device, light incident on the protrusion exits outwardly, is irregularly reflected by a reflector, and then enters again the light guide plate.

Further, JP-A-2005-251687 discloses a liquid crystal display device in which a light source is provided on the side face of a light guide plate and a light shielding material is provided on a flexible printed circuit to prevent the color of the flexible printed circuit from being reflected in a screen.

SUMMARY OF THE INVENTION

Light guide plates are generally manufactured by injection molding a transparent thermoplastic resin such as polycarbonate or polymethylmethacrylate. According to the method, however, it is difficult to obtain a light guide plate thinner than a certain thickness, for example, having a thickness of 1 mm or less because of the insufficient filling of a resin into a metal mold or the difficulty of removing a product from a mold.

Moreover, in the planar lighting unit in which a light source is provided on the side face of a light guide plate, light from the light source leaks into a screen, which causes brightness non-uniformity of the screen near the light source.

The invention has been made from the above-described standpoint, and it is an object of the invention to provide a liquid crystal display device including a thin light guide plate having a thickness of, for example, 1 mm or less. It is another object of the invention to provide a liquid crystal display device that can prevent light leakage from a light source.

Typical outlines of the invention disclosed herein will be briefly described below.

A liquid crystal display device includes: a liquid crystal panel having a liquid crystal layer interposed between a first substrate and a second substrate; a light guide plate disposed on a back face side of the liquid crystal panel, the light guide plate including a reflection face on a back face thereof, a first projection and a second projection formed so as to interpose the reflection face therebetween, and a light entering portion disposed on a side face thereof; and light sources disposed so as to face the light entering portion, wherein a light shielding member is formed between the liquid crystal panel and the light guide plate.

The light shielding member has a frame shape with four sides, and a side overlapping the light entering portion has a greater width than that of the others. The light shielding member has a frame shape with four sides, and a notch portion is formed on both ends of a side overlapping the light entering portion.

The light shielding member has a frame shape with four sides, and a side overlapping the light entering portion is cut off from the others. The light shielding member has a frame shape with four sides, and the light shielding member is a black two-sided adhesive tape.

A liquid crystal display device includes: a liquid crystal panel having a liquid crystal layer interposed between a first substrate and a second substrate; a light guide plate made of a thermoplastic material and disposed on a back face side of the liquid crystal panel, the light guide plate including a reflection face on a back face thereof, a first projection and a second projection formed so as to interpose the reflection face therebetween, and a light entering portion disposed on a side face thereof; and a plurality of light sources disposed so as to face the light entering portion, wherein the height of the light entering portion is greater at a portion facing the light source and smaller at a portion interposed between the light sources.

A padding is disposed at the portion of the light entering portion interposed between the light sources and having a smaller height. The padding is a two-sided adhesive tape.

According to the invention disclosed herein, it is possible to provide a liquid crystal display device including a thin light guide plate having a thickness of, for example, 1 mm or less. It is also possible to provide a liquid crystal display device that can prevent light leakage from a light source.

BRIEF DESCRIPTION OF THE DRAWINGS

FIG. 4 is an explanatory view of light reflected by a groove.

DESCRIPTION OF THE PREFERRED EMBODIMENT

Hereinafter, a preferred embodiment of the invention will be described with reference to the drawings.

Figure 1:
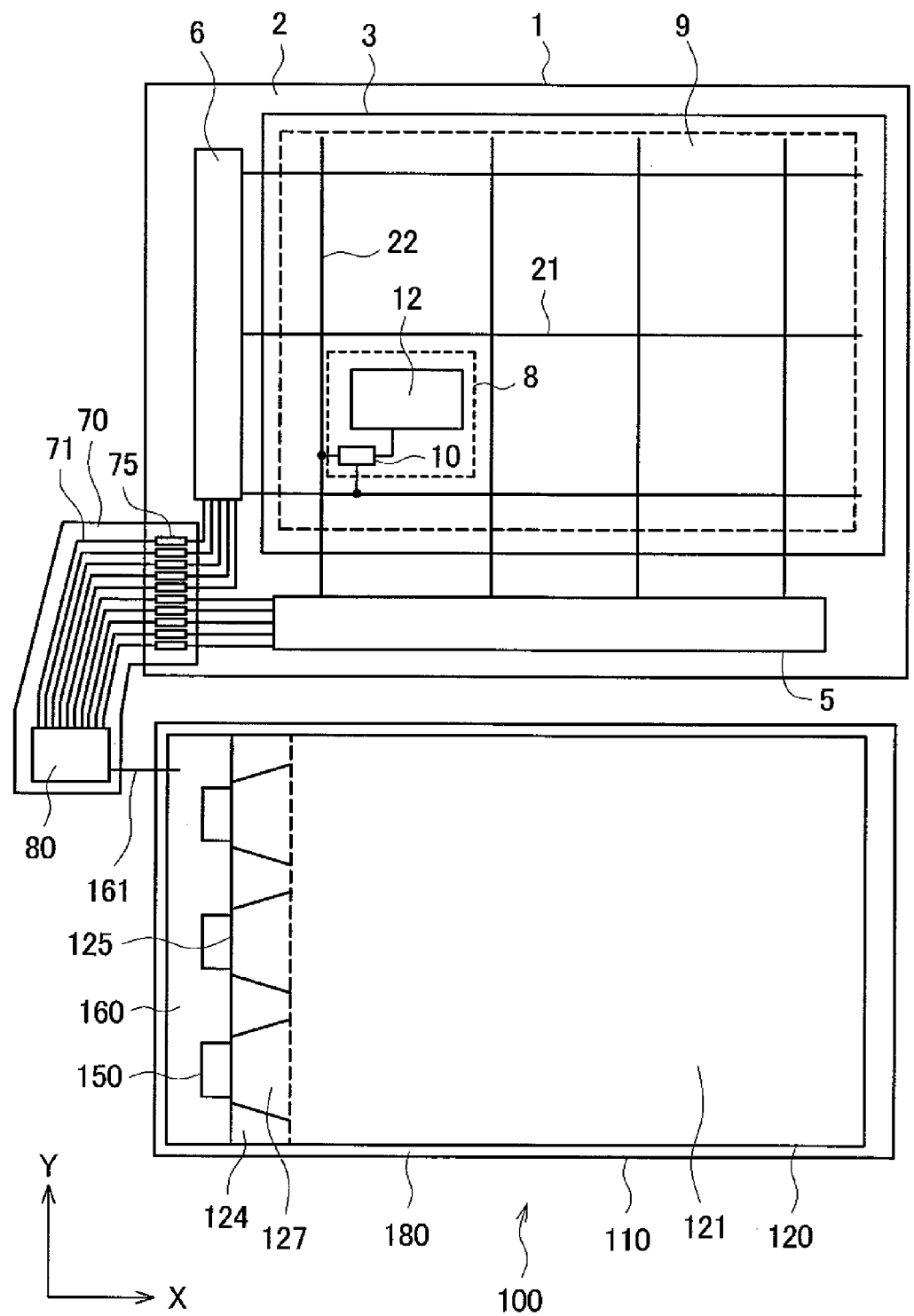
FIG. 1 is a plan view showing a liquid crystal display device according to an embodiment of the invention.

FIG. 1 is a plan view showing a liquid crystal display device 100 according to the embodiment. The liquid crystal display device 100 includes a liquid crystal panel 1, a backlight 110, and a control circuit 80. Signals and power supply voltage necessary for the display of the liquid crystal display device 100 are supplied from the control circuit 80. The control circuit 80 is mounted on a flexible substrate 70. Signals are transmitted to the liquid crystal panel 1 via wiring wires 71 and terminals 75. The liquid crystal panel 1 functions as a light switching member that controls light transmittance.

The backlight 110 includes a light guide plate 120, light emitting diodes 150 as light sources, and a housing case 180. The backlight 110 is provided for irradiating the liquid crystal panel 1 with light. In the liquid crystal panel 1, the transmission amount of the light irradiated from the backlight 110 is controlled to perform display. The backlight 110 is overlapped with the liquid crystal panel 1 with respect to an observer. In FIG. 1, however, the backlight 110 and the liquid crystal panel 1 are arranged vertically for facilitating the understanding. In the specification below, a direction in which the liquid crystal display device 100 faces an observer is referred to as a front face side, and the opposite direction is referred to as a back face side. A face of the liquid crystal display device 100 on the front face side is referred to as a front face, and a face on the back face side is referred to as a back face. The backlight 110 is generally disposed on the back face side of the liquid crystal panel 1, but may be disposed on the front face side. In such a case, the liquid crystal panel 1 controls the reflection amount of the light irradiated from the backlight 110.

The light guide plate 120 has substantially a rectangular shape. The light emitting diodes 150 are provided so as to face an incident face 125 as one side face of the light guide plate. Reference numeral 160 denotes a flexible substrate that electrically connects the plurality of light emitting diodes 150 with one another. The flexible substrate 160 and the control circuit 80 are electrically connected to each other via a wiring wire 161.

Light incident from the incident face 125 to the light guide plate 120 exits from an exit face 121 as a front face of the light guide plate. Inclined faces 127 are formed between the incident face 125 and the exit face 121 and guide light from the incident face 125 to the exit face 121. The incident face 125 and the inclined faces 127 form a light entering portion 124 through which the light from the light emitting diodes 150 is effectively transmitted to the exit face 121. The incident face 125 and the light entering portion 124 will be described in detail later.

Next, the liquid crystal panel 1 will be described. The liquid crystal panel 1 has two substrates of a TFT substrate 2 and a color filter substrate 3. A liquid crystal composition is interposed between the two substrates stacked to each other. A plurality of pixel portions 8 are provided on the TFT substrate 2. A pixel electrode 12 is provided in each of the pixel portions 8. The plurality of pixel portions 8 are arranged in a grid in a display region 9. Each of the pixel portions 8 functions as a light switching element that controls the transmission amount of the light from the backlight 110, thereby functioning as a pixel of the liquid crystal display device 100 to form an image in the display region 9. For preventing the drawing from being complicated, FIG. 1 shows only one pixel portion 8.

In FIG. 1, gate signal lines (also referred to as scanning lines) 21 extending in the x direction in the drawing and arranged in parallel in the y direction and drain signal lines (also referred to as video signal lines) 22 extending in the y direction and arranged in parallel in the x direction are provided. The gate signal lines 21 and the drain signal lines 22 cross each other. The pixel portion 8 is formed in a region surrounded by the gate signal lines 21 and the drain signal lines 22.

A switching element 10 such as a TFT (Thin Film Transistor) is provided in the pixel portion 8. A control signal is supplied from the gate signal line 21 to control the on and off of the switching element 10. When the switching element 10 is brought into an on state, a video signal transmitted via the drain signal line 22 is supplied to the pixel electrode 12.

The drain signal lines 22 are connected to a drive circuit 5. Video signals are output from the drive circuit 5. The gate signal lines 21 are connected to a drive circuit 6. Control signals are output from the drive circuit 6. The gate signal lines 21, the drain signal lines 22, the drive circuit 5, and the drive circuit 6 are formed above the same TFT substrate 2. The drive circuit 5, the drive circuit 6, and the control circuit 80 can be formed above one semiconductor chip.

The driving method of liquid crystal in the liquid crystal panel 1 is not specifically limited. Any of a TN (Twisted Nematic) system, a VA (Vertical Alignment) system, and an IPS (In Plane Switching) system may be used.

Figure 2A:
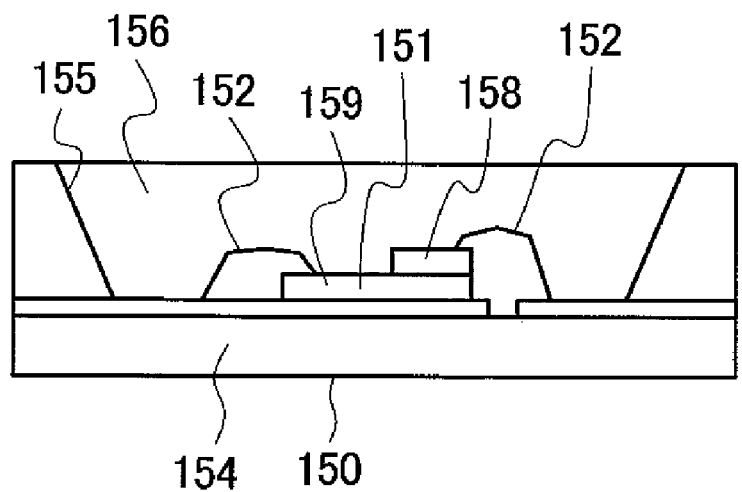
FIGS. 2A and 2B are schematic views of a light emitting diode as a light source.
Figure 2B:
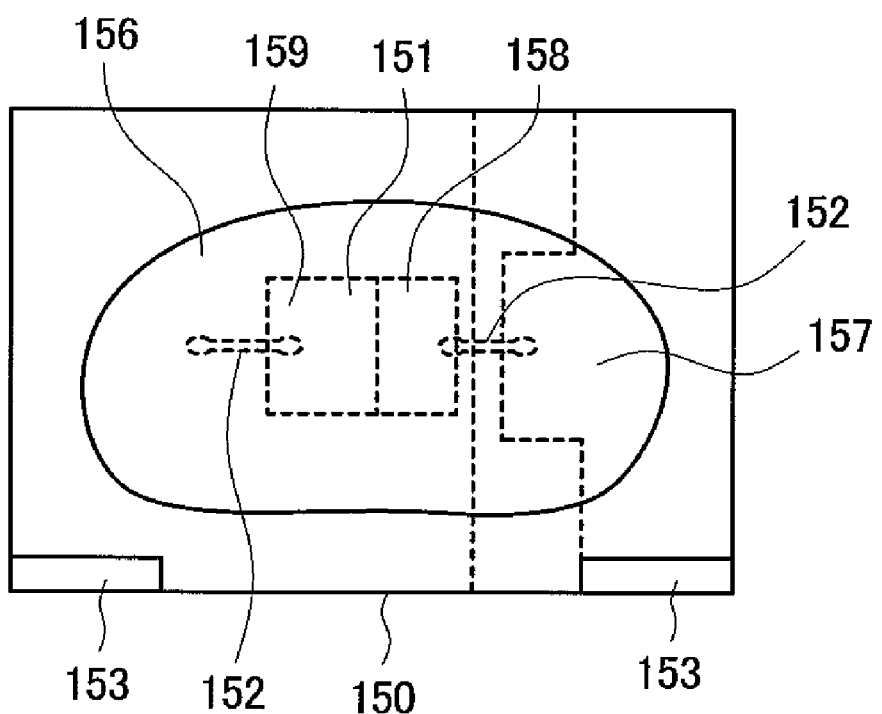

Next, FIGS. 2A and 2B are schematic views of the light emitting diode 150 as a light source. FIG. 2A is a schematic cross-sectional view. FIG. 2B is an elevation view of a light exiting side.

The light emitting diode 150 has a light emitting diode chip 151 as a light emitting portion mounted on a chip substrate 154. The light emitting diode chip 151 has a pn junction and emits light at a specific wavelength when voltage is applied to the pn junction. A p-electrode (anode) 158 and an n-electrode (cathode) 159 are respectively provided in a p type semiconductor layer and an n type semiconductor layer that form the pn junction.

Wires 152 are each connected to the p-electrode 158 and the n-electrode 159. The wires 152 electrically connects the chip terminals 153 provided for connecting the light emitting diode 150 to the outside with the p-electrode 158 and the n-electrode 159.

A fluorescence emitting portion 156 is provided on the exit face side of the light emitting diode chip 151 in some cases. The fluorescence emitting portion 156 has a function of converting the wavelength of light emitted from the light emitting diode chip 151. Reference numeral 155 denotes a reflection portion that reflects light forward. An exit face 157 from which light exits is formed on the front face side of the LED 150.

Figure 3A:
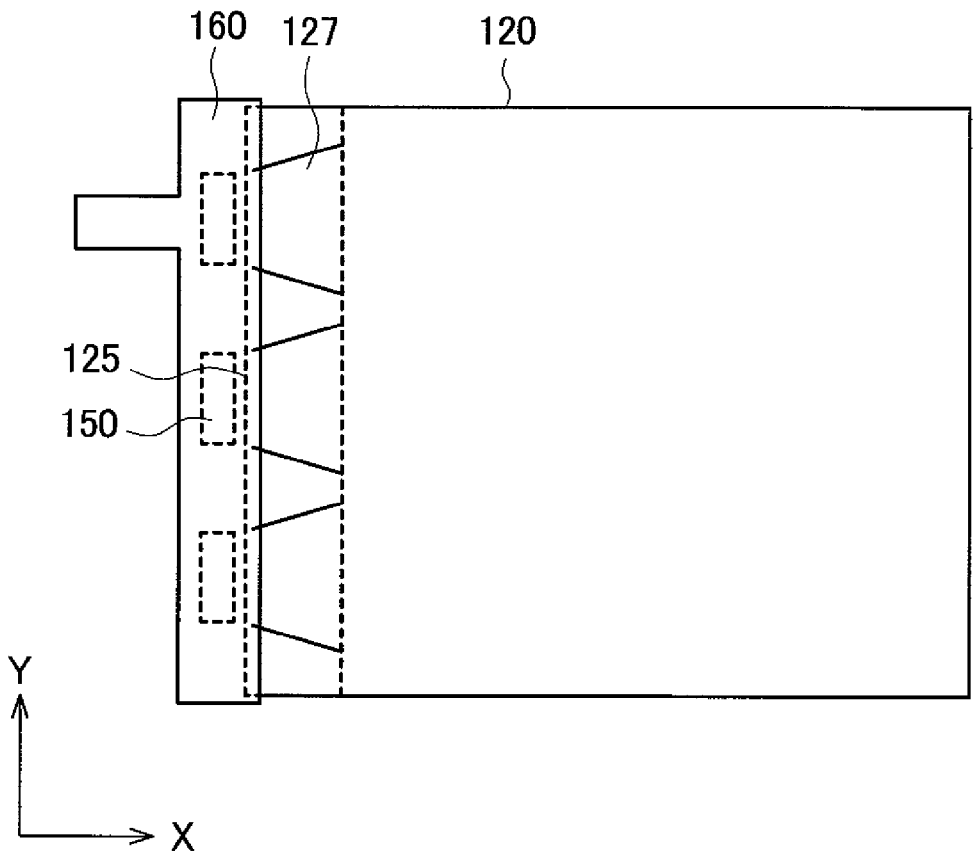
FIGS. 3A and 3B are schematic views of a light guide plate.
Figure 3B:
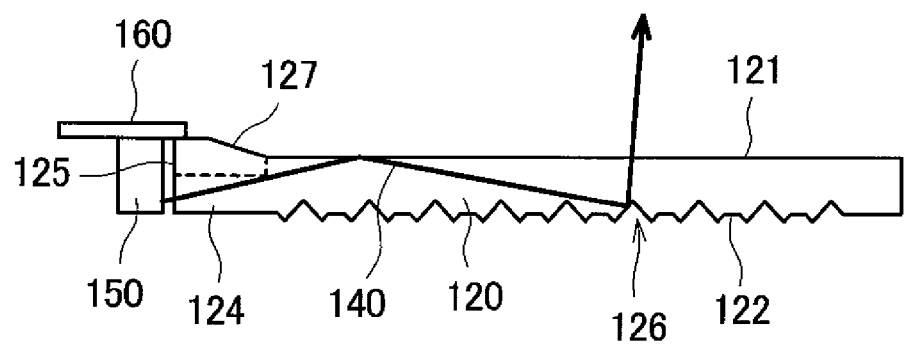

Next, FIGS. 3A and 3B are schematic views of the light guide plate 120. FIG. 3A is a schematic plan view. FIG. 3B is a schematic side view. The light guide plate 120 has substantially a rectangular shape as shown in FIG. 3A and has the exit face 121 as a front face and a back face 122 as shown in FIG. 3B. The light guide plate 120 is formed of a light-transmissive thermoplastic material such as polycarbonate or polymethylmethacrylate and has a sheet shape. The thickness thereof is preferably from 1.0 mm to 0.1 mm. Here, the thickness of the light guide plate 120 means the interval between the exit face 121 and the back face 122.

Although a cross section of the light guide plate 120 is substantially a rectangular shape in FIG. 33, the inclined face 127 is formed so as to be smoothly continuous from the incident face 125 to the exit face 121. As shown in FIG. 3A, the inclined face 127 has a shape of an unfolded fan extending from the light emitting diode 150 in a direction (in the x direction in the drawing) remote from the optical axis direction of the light emitting diode 150 when the light guide plate 120 is viewed in a plane. The inclined face 127 is effective when the thickness of the light emitting diode 150 is greater with respect to the thickness of the light guide plate 120 at the exit face 121.

FIGS. 3A and 3B show the positional relationship among the light guide plate 120, the light emitting diodes 150, and the flexible substrate 160. The incident face 125 is provided on at least one side of the light guide plate 120. The plurality of light emitting diodes 150 are provided in the vicinity of the incident face 125. The light emitting diodes 150 are arranged along the incident face 125 below the flexible substrate 160.

An intermediate member (not shown) such as a two-sided adhesive tape is provided on the light-guide-plate 120 side of the flexible substrate 160. The flexible substrate 160 is bonded and fixed to the light guide plate 120, so that the position of light emitting diode 150 is aligned to the incident face 125.

Next, a light 140 emitted from the light emitting diode 150 will be described by using FIG. 3B. The light 140 exiting from the light emitting diode 150 is incident on the light guide plate 120 through the incident face 125. The refractive index of the light guide plate 120 is greater than that of air. Therefore, the light 140 reaching the incident face 125 at an angle greater than a specific angle with respect to the normal direction of the incident face 125 is reflected. The light 140 reaching the incident face 125 at an angle smaller than the specific angle enters into the light guide plate 120.

The exit face 121 and the back face 122 of the light guide plate 120 are substantially perpendicular to the incident face 125. The light entered into the light guide plate 120 propagates through the light guide plate 120 while repeating total reflection at the exit face 121 and the back face 122 of the light guide plate 120. The back face 122 is provided with V-shaped grooves 126 as a reflection portion. A part of the light 140 propagating through the light guide plate 120 is reflected toward the exit-face 121 side by the groove 126 provided on the back face 122 and exits from the exit face 121. The grooves 126 are provided in a direction substantially perpendicular to the optical axis direction of the light emitting diode 150.

Next, the light 140 that is reflected by the groove 126 will be described by using FIG. 4. In FIG. 4, prism sheets 112 and 113, a diffuser 114, and a reflective sheet 115 are shown in addition to the light guide plate 120. It is assumed that the light emitting diode 150 is arranged on the left in the drawing. The grooves 126 constitute the surface structure formed on the back face 122 of the light guide plate 120. The groove 126 includes a first projecting face 128 that protrudes outwardly from the back face 122, a first light reflecting face 129 that is continuous from the first projecting face and enters the inside of the back face 122, a second light reflecting face 130 that is continuous from the first light reflecting face 129 and protrudes to the outside of the back face 122, and a second projecting face 131 that is continuous from the second light reflecting face to the back face 122 in this order toward the optical axis direction of the light emitting diode 150. The first light reflecting face 129 and the second light reflecting face 130 have an angle of from 1 degree to 35 degree with respect to the back face 122. In the embodiment, the light 140 exiting from the light emitting diode 150 and propagating through the light guide plate 120 is mainly reflected by the first light reflecting face 129 and changes its traveling direction so as to have an angle at which the light 140 can exit from the exit face 121. That is, as described above, the light 140 repeats total reflection in the light guide plate 120 and propagates toward the optical axis direction of the light emitting diode 150. However, mainly due to the first light reflecting face 129, the light 140 has an angle at which the light can exit and exits from the exit face 121 of the light guide plate 120.

It is needless to say that the second light reflecting face 130 functions in the same manner as the first light reflecting face 129 when the light emitting diode 150 as a light source is further arranged on the right in the drawing.

In the embodiment, grooves 132 having the same surface structure as the grooves 126 of the back face 122 are provided on the exit face 121 of the light guide plate 120 so as to be substantially perpendicular to the grooves 126. The groove 132 functions to deflect the light 140 reflected by the first light reflecting face 129 toward the front face side of the light guide plate 120. The light 140 exiting from the light guide plate 120 is diffused by the diffuser 114 and then changes its direction toward the front face side of the light guide plate 120 by the prism sheets 113 and 112. The prism sheets 113 and 112 are transparent sheets each having a triangular prism-shaped surface structure on the surface. They are arranged such that the directions of the triangular prism-shaped surface structures are perpendicular to each other. The reflective sheet 115 reflects the light 140 exiting toward the back face of the light guide plate 120 and introduces the same again into the light guide plate 120. Since the prism sheet 113 and the grooves 132 are similar to each other in operation and effect, either one of them may be omitted if unnecessary.

In the embodiment, the light guide plate 120 is thin and easily deformed. However, a protrusion 133 formed of the first projecting face 128 and the first light reflecting face 129, or the second projecting face 131 and the first light reflecting face 130 prevents the close contact of the light guide plate 120 with the reflective sheet 115. This provides an effect of suppressing the non-uniformity of brightness distribution or light leakage caused by the close contact of the light guide plate 120 with the reflective sheet 115.

Next, a method for forming the grooves 126 will be described. In the embodiment as described above, since the light guide plate 120 is as thin as 1.0 mm to 0.1 mm, it is difficult to form the grooves 126 by injection molding. Therefore, the grooves 126 are formed by a method including the following steps.

First Step

A sheet 170 made of a thermoplastic material is heated to be softened (heating step). When the sheet 170 is a thermoplastic resin such as polycarbonate or polymethylmethacrylate, the heating temperature may be set to the softening point or more of the thermoplastic resin. When the sheet 170 is glass, the temperature may be set to the glass-transition point or more.

Second Step

Figure 5:
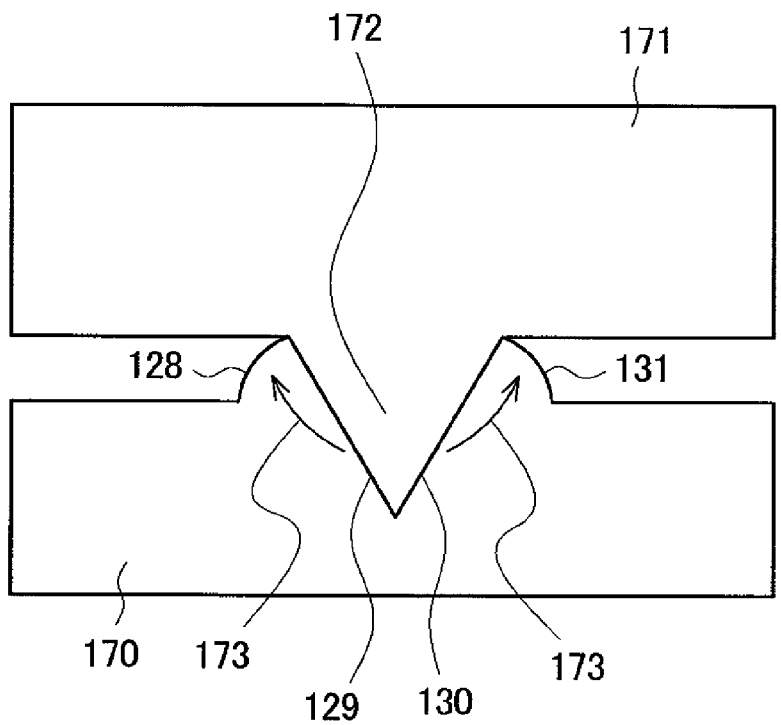
FIG. 5 shows the state where a mold is pressed onto a sheet.

A mold 171 is pressed onto the sheet 170 (pressing step). The mold 171 is preferably a metal mold made of metal and has a number of triangular prism-shaped ridges 172 formed on the surface. The mold 171 is pressed such that the ridge 172 bites into the surface of the sheet 170 in a predetermined amount. FIG. 5 shows the state where the mold 171 is pressed onto the sheet 170. As shown in FIG. 5, the thermoplastic material constituting the sheet 170 is pressed by the ridge 172 and flows as indicated by arrows 173. As a result, on one hand, the first light reflecting face 129 and the second light reflecting face 130 are formed at a portion where the sheet 170 is brought into contact with the ridge 172 of the mold 171. On the other hand, the first projecting face 128 and the second projecting face 131 are formed as free surfaces at portions to which the thermoplastic material constituting the sheet 170 flows to project without being in contact with the mold 171.

Third Step

The sheet 170 is removed from the mold 171 (removing step). In this case, the sheet 170 may be cooled if necessary. As is apparent from FIG. 5, in the embodiment, the sheet 170 and the mold 171 are in contact with each other only at the ridge 172 of the mold 171 but not on the entire surfaces thereof. Therefore, the sheet 170 is easily removed from the mold 171. According to the method, therefore, the thin light guide plate 120 can be obtained from the thin sheet 170 having a thickness of about from 1.0 mm to 0.1 mm.

Figure 6:
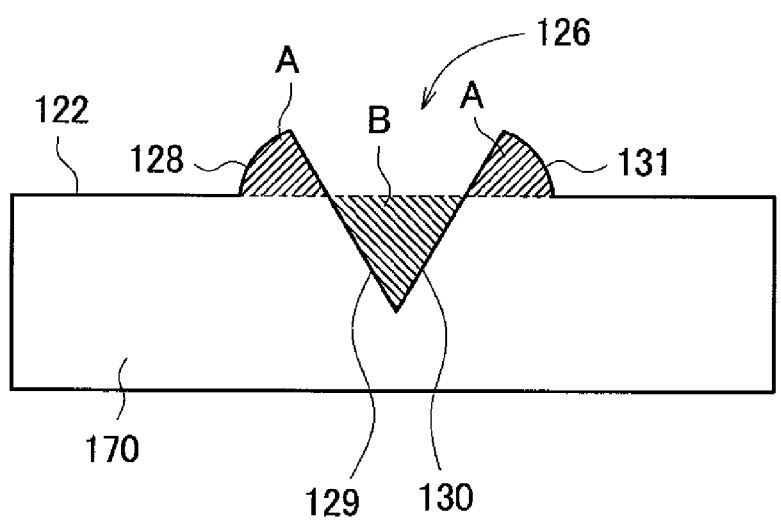
FIG. 6 shows the sheet removed from the mold.

FIG. 6 shows the sheet 170 removed from the mold 171. In this case, before and after the formation of the grooves 126 by the above-described method, the sheet 170 does not change in volume. Accordingly, when attention is directed to the groove 126, the volume of the thermoplastic material positioned on the surface of the sheet 170 and on the outside of a face serving as the back face 122 of the light guide plate 120, that is, the portions indicated by A in the drawing and the volume of a space portion positioned inside the back face 122, that is, the portion indicated by B in the drawing are equal to each other.

Figure 7:
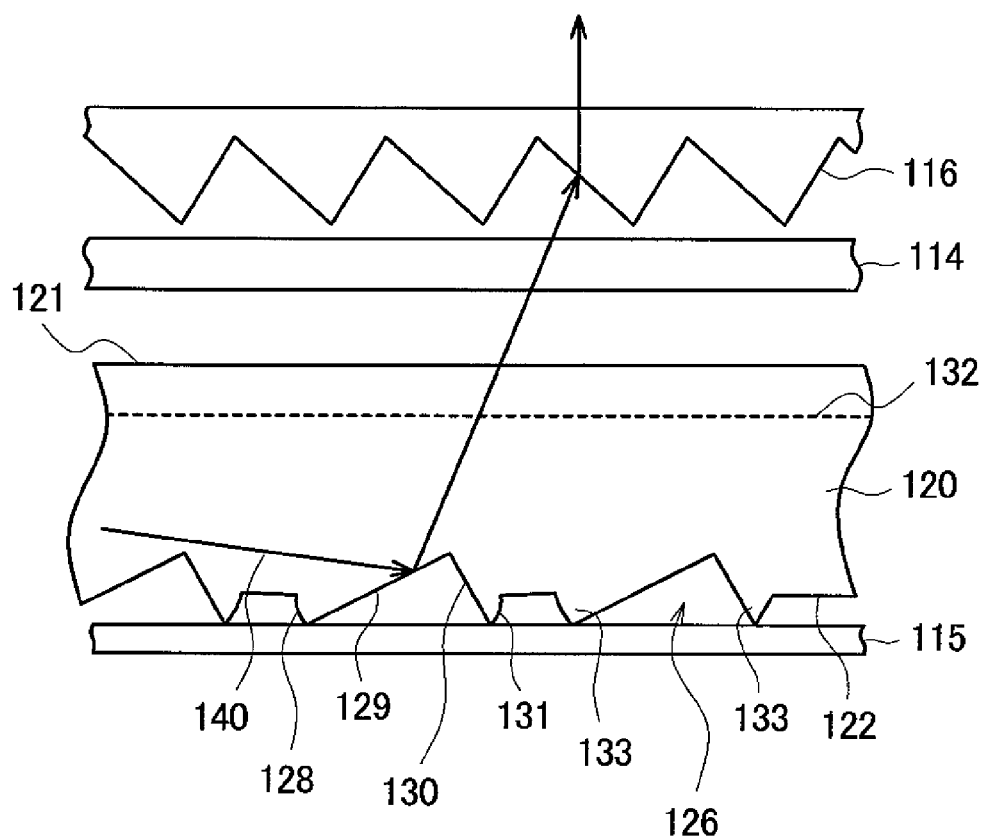
FIG. 7 shows a modification of the light guide plate with regard to the groove.

FIG. 7 shows a modification of the light guide plate 120 with regard to the groove 126. As shown in FIG. 7, an angle that the first light reflecting face 129 of the groove 126 makes with the back face 122 may differ from an angle that the second light reflecting face 130 makes with the back face 122. In this case, when the first light reflecting face 129 intersects the back face 122 at a shallow angle, the light 140 incident from the left in the drawing exits mainly in a direction inclined to the right in the drawing with respect to the vertical direction of the exit face 121. An asymmetrical prism sheet 116 is provided above the light guide plate 120 via the diffuser 114 to deflect the direction of the light 140 toward the front face side of the light guide plate 120. With this configuration, since a rate of the light 140 incident on the first light reflecting face 129 at a shallow angle is increased, a rate of the light 140 reflected toward the front face side is increased. Therefore, the use efficiency of the light 140 can be enhanced. Also in the modification, the prism sheet 113 may be provided like the foregoing example.

Figure 8:
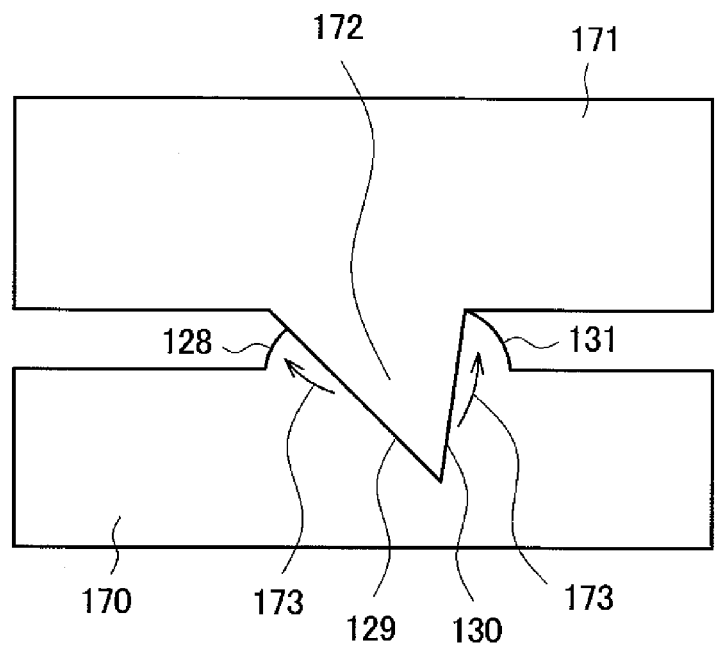
FIG. 8 shows the state of forming the groove of the modification.

FIG. 8 shows the state of forming the groove 126 of the modification. FIG. 8 differs from FIG. 5 in that the ridge 172 of the mold 171 is bilaterally asymmetric. Also in this case, the thermoplastic material constituting the sheet 170 flows as indicated by the arrows 173, so that the first projecting face 128 and the second projecting face 131 are formed as free surfaces. The first light reflecting face 129 and the second light reflecting face 130 are formed while being in contact with the ridge 172 of the mold 171.

Figure 9:
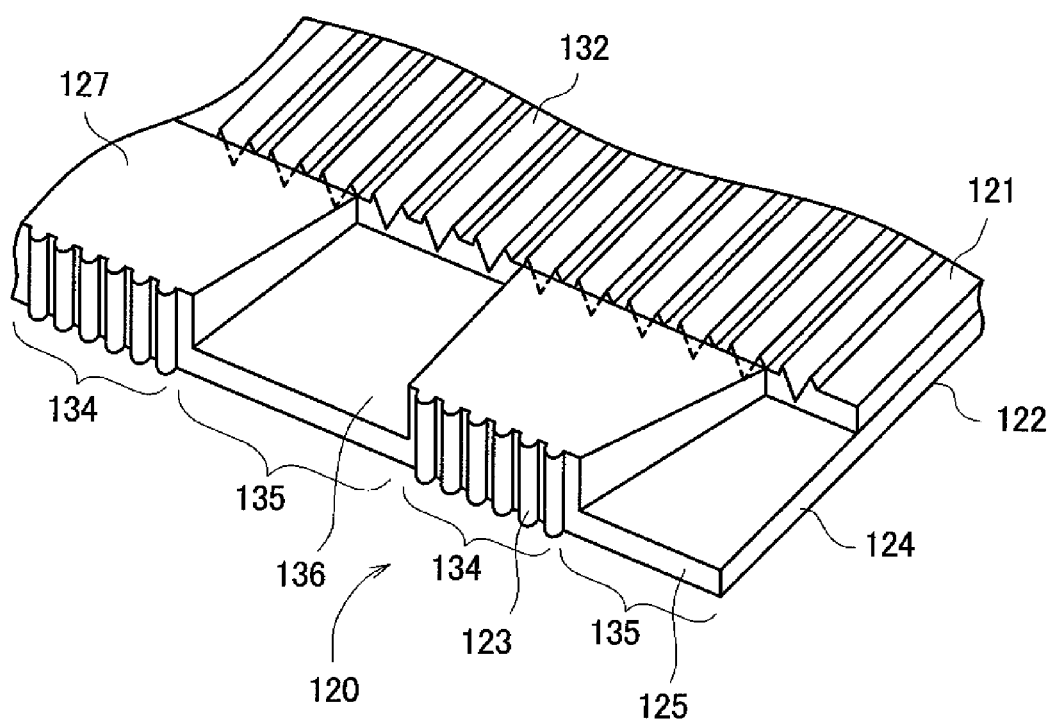
FIG. 9 is a perspective view of the vicinity of an incident face of the light guide plate.

Consequently, a structure of the vicinity of the incident face 125 of the light guide plate 120 will be described. FIG. 9 is a perspective view of the vicinity of the incident face 125 of the light guide plate 120. A plurality of light introducing portions 134 and a plurality of light non-introducing portions 135 are provided on the incident face 125. The light introducing portion 134 has a thickness greater than that of the light guide plate 120. The light non-introducing portion is provided at a portion interposed between the light introducing portions 134 and a portion interposed between the light introducing portion 134 and an end of the light guide plate 120. The light non-introducing portion has a thickness smaller than that of the light guide plate 120. Therefore, the incident face 125 has a shape with concavities and convexities on the front face side of the light guide plate 120 as viewed from the normal direction of the incident face. In this case, the light introducing portions 134 correspond to the convexities, while the light non-introducing portions 135 correspond to the concavities. An end side of the light introducing portion 134 on the front face side is connected to the exit face 121 so as to be smoothly continuous with the exit face with the inclined face 127. On the other hand, an end side of the light non-introducing portion 135 on the front face side is connected to the exit face 121 in parallel therewith a concave face 136. A level difference is formed at the connecting portion of the concave face and the exit face. Lenses 123 are provided in the light introducing portion 134 of the incident face 125. The lens 123 scatters light incident from the light introducing portion 134. The light incident from the light introducing portion 134 is introduced to the exit face 121 through the inclined face 127. The incident face 125 formed of the light introducing portions 134 and the light non-introducing portions 135, the inclined faces 127, and the concave faces 136 form the light entering portion 124.

As described above, the thickness of the light introducing portion 134 is made greater than that of the light guide plate 120, so that the light guide plate 120 thinner than the light emitting diode 150 can be used. Preferably, the thickness of the light introducing portion 134 is made substantially equal to that of the light emitting diode 150.

Figure 10A:
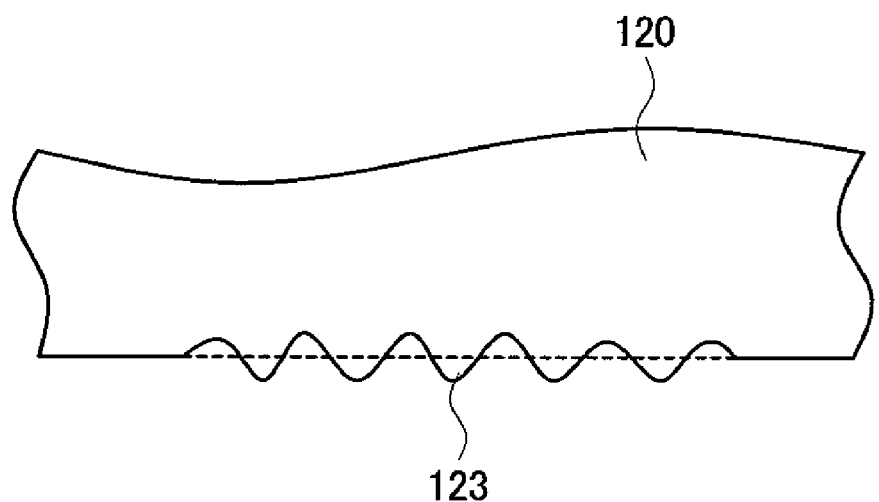
FIGS. 10A and 10B each illustrate the shape of a lens.
Figure 10B:
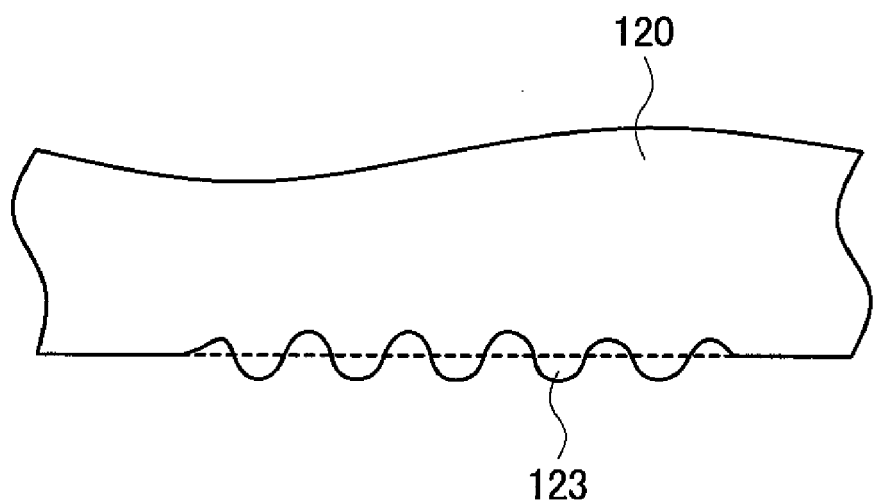

Although various kinds of shapes can be adopted for the lens 123, a shape extending in a thickness direction of the light guide plate 120 is preferred. This is because, as will be described later, the light guide plate 120 is prepared by punching the sheet 170. Therefore, the lens 123 has preferably a shape to be easily punched. For example, a shape having a triangle cross-section as shown in FIG. 10A and a shape obtained by joining a plurality of cylindrical lenses having a semicircle shape as shown in FIG. 10B can be illustrated. In view of the easiness of the process, it is preferable to select a shape of lens with a rounded corner. However, a general shape of lenticular lens or a saw-tooth shape may be adopted.

Next, a method for forming the light entering portion 124 and a method for manufacturing the light guide plate 120 will be described. The light entering portion 124 is formed by a method including the following steps.

First Step

The sheet 170 made of a thermoplastic material is heated to be softened (heating step). The heating temperature is the same as in the method for forming the groove 126. In this case, the size of the sheet 170 is preferably set to be larger than that of the light guide plate 120 to be obtained. The thickness of the sheet 170 is equal to that of the light guide plate 120 to be obtained.

Second Step

A mold is pressed onto the sheet 170 (pressing step). Also the mold in this case is preferably a metal mold made of metal. The mold has a shape complementary to the light entering portion 124 of the sheet 170. Therefore, the thermoplastic material at a portion serving as the concave face 136 of the sheet 170 is pressed to flow into a portion serving as the inclined face 127 of the sheet 170. As a result, a portion serving as the light introducing portion 134 having a thickness greater than that of the sheet 170 is formed. In this case, the grooves 126 and the grooves 132 may be formed simultaneously or may be formed in a different step.

Third Step

The sheet 170 is removed from the mold (removing step). In this case, the sheet 170 may be cooled if necessary.

Fourth Step

Figure 11:
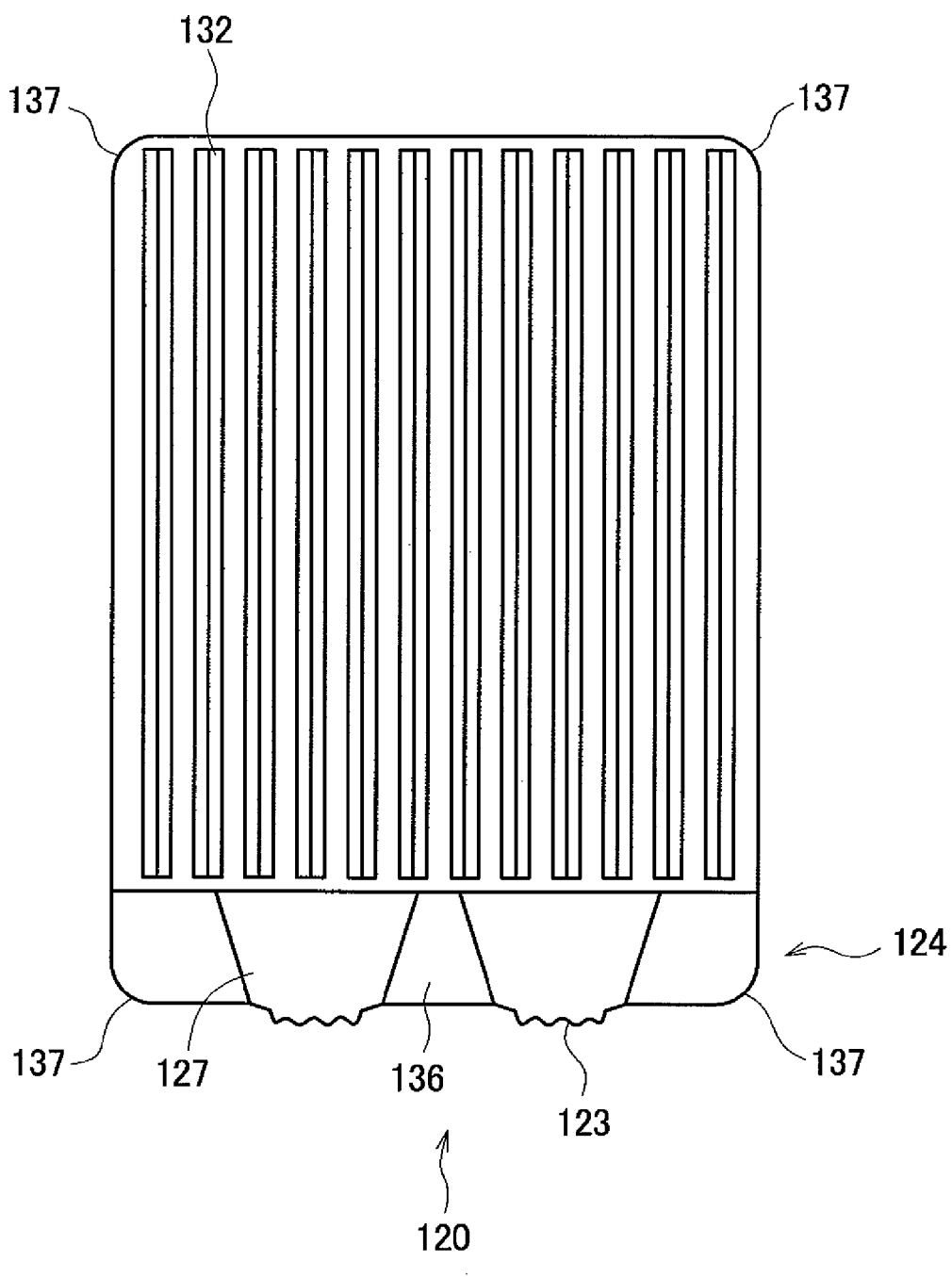
FIG. 11 is a plan view showing the light guide plate punched from the sheet.

The outer circumference of the sheet 170 is cut out, so that the light guide plate 120 having the light entering portion 124 is obtained (cutting-out step). FIG. 11 is a plan view showing the light guide plate 120 cut out from the sheet 170. The lens 123 is formed by the step. Since punching process is used as a cut-out method in the embodiment, corners 137 of the light guide plate 120 are slightly rounded for facilitating the process.

In the manufacture of the light guide plate 120 according to the method, one light guide plate 120 may be obtained from one sheet 170, or a number of light guide plates 120 may be cut out from one sheet 170, so that multiple plates are formed at one time. Moreover, the light guide plate 120 may be manufactured from the sheet 170 having a plate shape by a batch process, or the light guide plate 120 may be manufactured by continuously unwinding the sheet 170 having a belt shape from a raw sheet roll by a continuous process. In that case, an embossing roll can be used as a mold.

Figure 12:
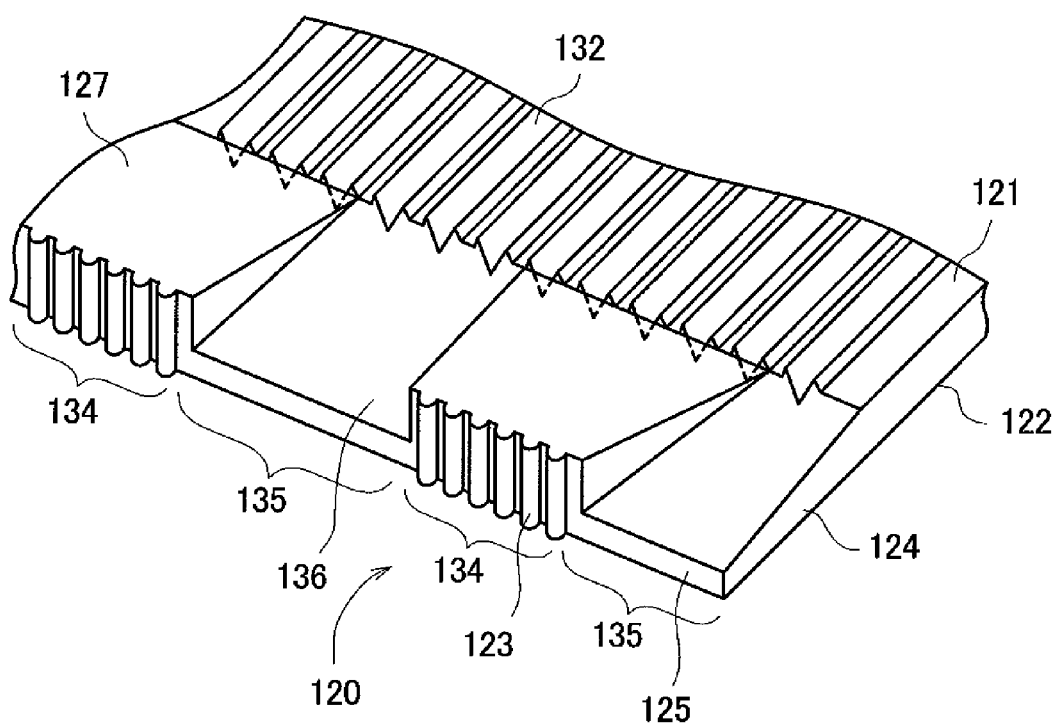
FIG. 12 shows a modification of a light entering portion.
Figure 13:
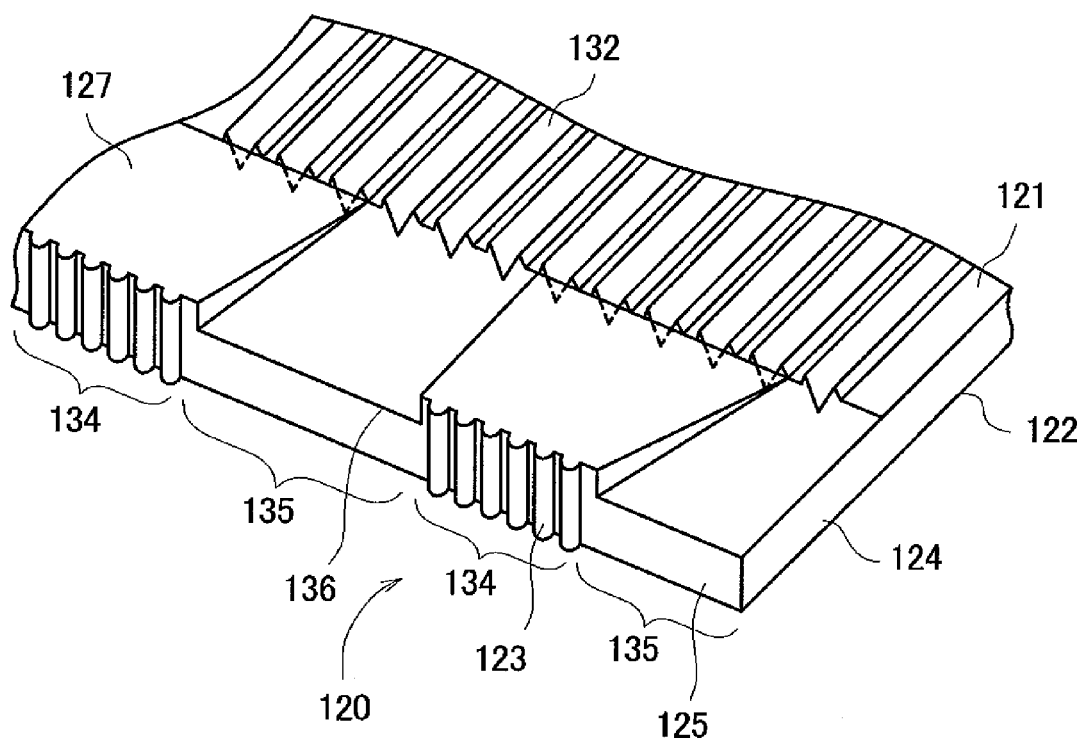
FIG. 13 shows a modification of the light entering portion.

FIGS. 12 and 13 show modifications of the light entering portion 124. FIG. 12 shows an example in which the concave face 136 is formed as an inclined face that is smoothly connected to the exit face 121. FIG. 13 shows an example in which the concave face 136 is flush with the exit face and the thickness of the light non-introducing portion 135 is the same as that of the light guide plate 120. The example of FIG. 13 can be manufactured by pressing a portion of the sheet 170 outside the light guide plate 120 and making a thermoplastic material flow into a portion serving as the inclined face 127.

Figure 14:
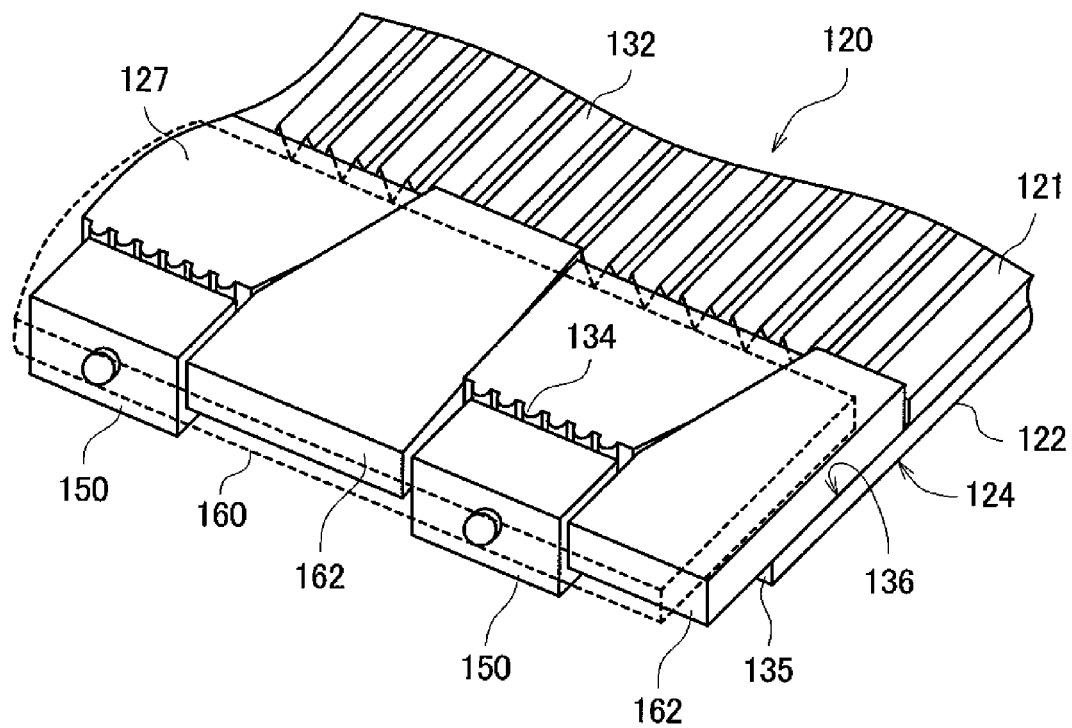
FIG. 14 shows an attaching structure for attaching the light emitting diode to the light guide plate.

Consequently, an attachment structure for attaching the light emitting diodes 150 to the light guide plate 120 will be described. FIG. 14 shows an attachment structure for attaching the light emitting diodes 150 of the embodiment to the light guide plate 120. The light emitting diodes 150 are attached to the back face side of the flexible substrate 160 and arranged so as to face the light introducing portion 134. The flexible substrate 160 is fixed to the light guide plate 120 via intermediate members 162. In FIG. 14, only the outer shape is shown for the flexible substrate 160 by broken lines for facilitating the understanding.

As shown in FIG. 14, the intermediate member 162 has a shape complementary to the concave face 136 and is fixed to the concave face 136 at the back face. In other words, the intermediate member 162 is fixed to the exit face 121 as a front face of the light guide plate 120 while being adjacent to the light non-introducing portion 135. A front face of the intermediate member 162 is fixed to the flexible substrate 160. The thickness of the intermediate member 162 is preferably equal to the difference between the thickness of the light introducing portion 134 and the thickness of the light non-introducing portion 135. With this configuration, a fixing structure is not required between the flexible substrate 160 and the inclined face 127 as a front face of the light introducing portion 134, by which amount the thickness of the attaching structure can be reduced.

Although the intermediate member 162 is a two-sided adhesive tape in the embodiment, this is not restrictive. The intermediate member 162 may be prepared from an appropriate material. The thickness of the intermediate member 162 is not necessarily constant. When the concave face 136 is an inclined face as described above, the thickness may be changed along with the inclined face. Further, although the flexible substrate 160 is illustrated in a rectangular shape that covers the light entering portion 124 and the light emitting diode 150, this is not restrictive. The flexible substrate 160 may have any shape as along as it can fix the light emitting diode 150 via the intermediate member 162.

Figure 15:
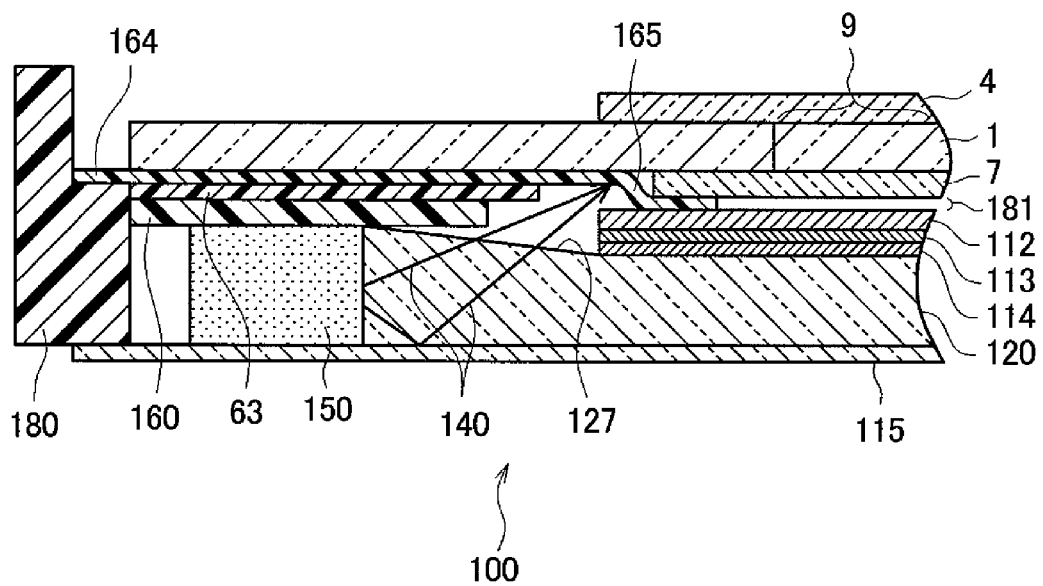
FIG. 15 is a cross-sectional view of the liquid crystal display device.

A structure for preventing light leakage from a light source in the embodiment will be described. FIG. 15 is a cross-sectional view of the liquid crystal display device 100. FIG. 15 shows the positional relationship among the liquid crystal panel 1, polarizers 4 and 7 respectively attached to the front and back faces of the liquid crystal panel, the light guide plate 120, the prism sheets 112 and 113 and the diffuser 114 as optical sheets attached to the front face of the light guide plate, the reflective sheet 115, the light emitting diode 150, and the flexible substrate 160. The liquid crystal panel 1 and the flexible substrate 160 are attached to the housing case 180 via a light shielding member 164. A spacer 163 is inserted between the light shielding member 164 and the flexible substrate 160 if necessary. A gap 181 with a predetermined width is provided at a position corresponding to the display region 9.

The light shielding member 164 has a function of preventing light from entering from the peripheral portion to the display region 9. Preferably, a black two-sided adhesive tape is used for the light shielding member. The light shielding member 164 has a frame shape in a plan view and fixes the liquid crystal panel 1 and the light guide plate 120 to the housing case 180 over the entire outer circumference. In the embodiment, the light shielding member 164 has an extended portion 165 extended in a tongue shape from a position corresponding to the light emitting diode 150 toward the optical axis direction of the light emitting diode 150. The extended portion 165 bends and hangs in a direction remote to the back face side of the liquid crystal panel 1 and is fixed to the prism sheet 112 as shown in FIG. 15. In other words, the extended portion 165 is indirectly fixed to the light guide plate 120 via the prism sheets 112 and 113 and the diffuser 114. The extended portion 165 may be directly fixed to the light guide plate 120. A front face of the extended portion 165 as a face on the opposite side may be or may not be fixed to the polarizer 7.

When the extended portion 165 as described above is provided, the light 140 exiting from the light emitting diode 150 and leaking from the inclined face 127 to the front face side is blocked by the extended portion 165, thereby not reaching the display region 9 as shown in FIG. 15. It is considered that the leaking from the inclined face 127 is due to the first projecting face 128 and the second projecting face 131 of the groove 132 provided adjacent to the inclined face 127 as shown in FIG. 9.

Figure 16:
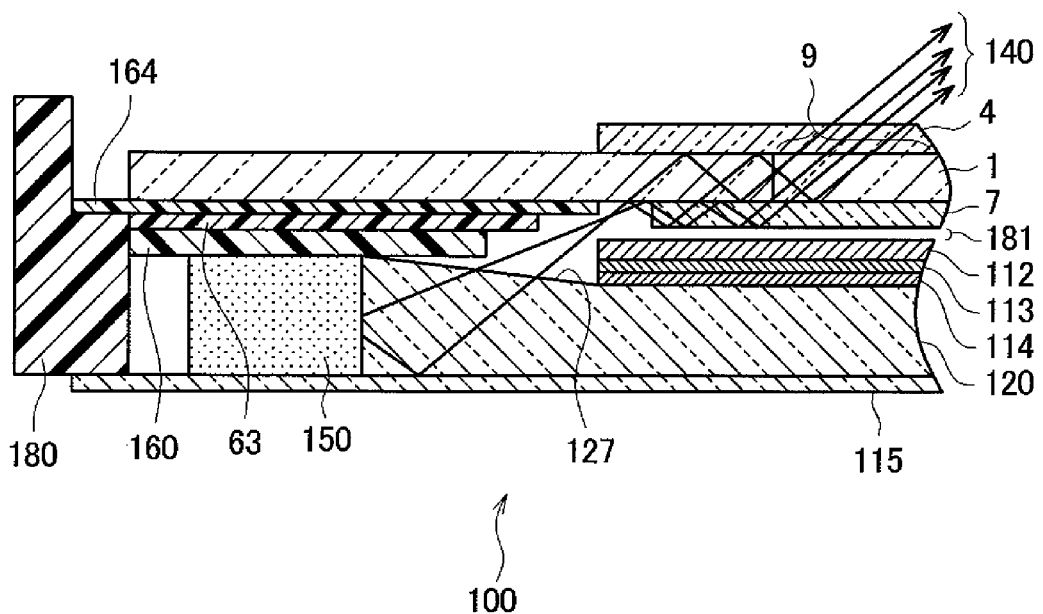
FIG. 16 is a reference cross-sectional view of a liquid crystal display device in which an extended portion is not provided.

For facilitating the understanding of the effect, a reference example will be described in which the extended portion 165 is not provided in the liquid crystal display device 100 according to the embodiment. FIG. 16 is a reference cross-sectional view of the liquid crystal display device 100 in which the extended portion 165 is not provided. In the reference example, members equal to those of the embodiment are denoted by the same numeral references as in the embodiment, and the detailed description thereof is omitted.

As is apparent from FIG. 16, when the extended portion 165 is not provided, the light 140 exiting from the light emitting diode 150 and leaking to the front face side of the inclined face 127 is incident on the liquid crystal panel 1 or the polarizer 7 and can reach the display region 9 while repeating reflection. Therefore, when the extended portion 165 is not provided, brightness non-uniformity might be caused in the display region 9.

Figure 17A:
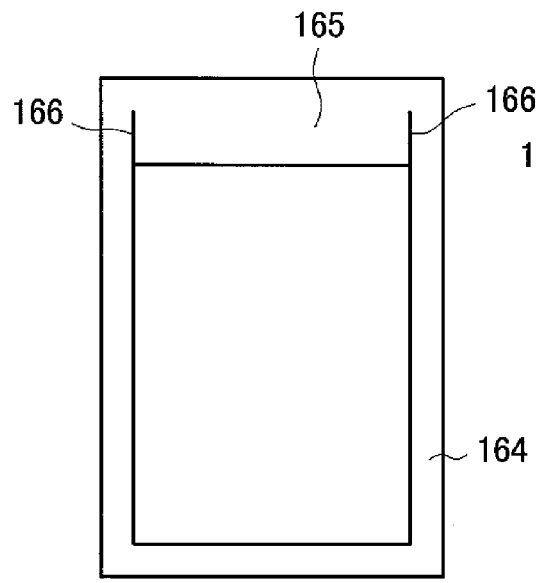
FIGS. 17A to 17D each show the shape of a light shielding member.
Figure 17B:
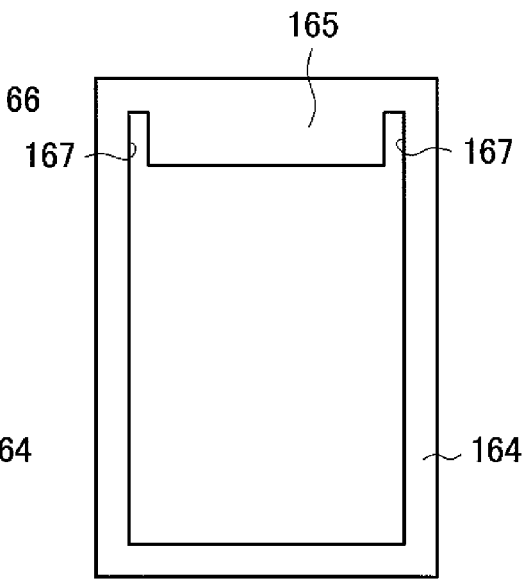
Figure 17C:
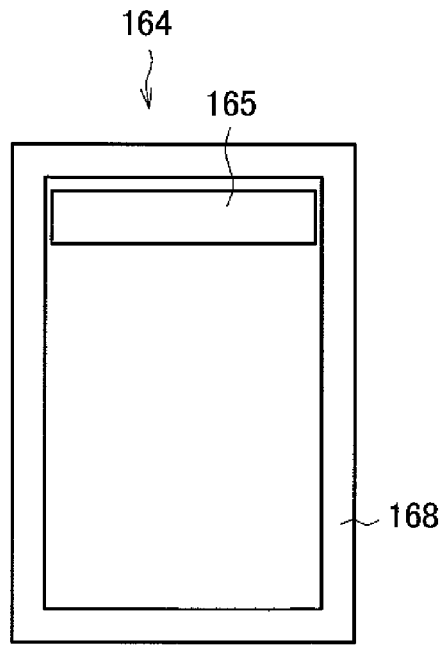
Figure 17D:
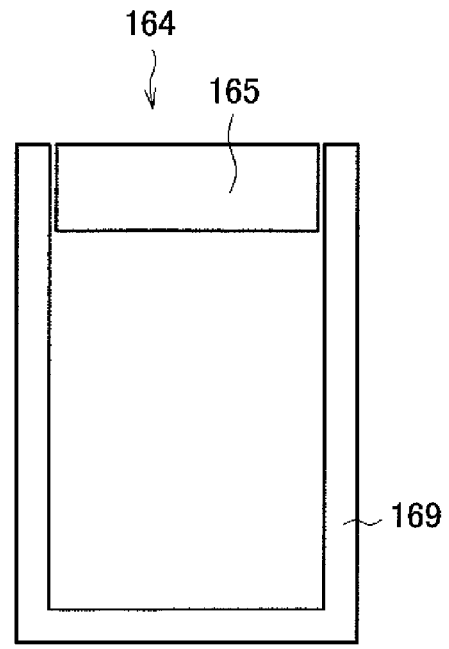

FIGS. 17A to 17D show various kinds of shapes of the light shielding member 164. FIG. 17A shows an example in which a cut portion 166 is provided toward an outer side of the light shielding member 164 on both ends of one side of a rectangular opening of the light shielding member 164 having a frame shape to form the extended portion 165. FIG. 17B shows an example in which a notch portion 167 having a predetermined width is provided toward the outer side of the light shielding member 164 on both ends of one side of the rectangular opening of the light shielding member 164 having a frame shape to form the extended portion 165. FIG. 17C shows an example in which the extended portion 165 having a rectangular shape is disposed as another member inside an outside member 168 having a frame shape to form the light shielding member 164. FIG. 17D shows an example in which the extended portion 165 having a rectangular shape is disposed as another member inside a U-shaped outside member 169 to form the light shielding member 164. The light shielding member 164 may have any shape as long as it can fix the liquid crystal panel 1 and the light guide plate 120 to the housing case 180 over the entire outer circumference and it can block the light 140 leaked from the inclined face 127 to the front face side. Other shapes may be adopted in addition to the shapes illustrated in FIGS. 17A to 17D.

Figure 18:
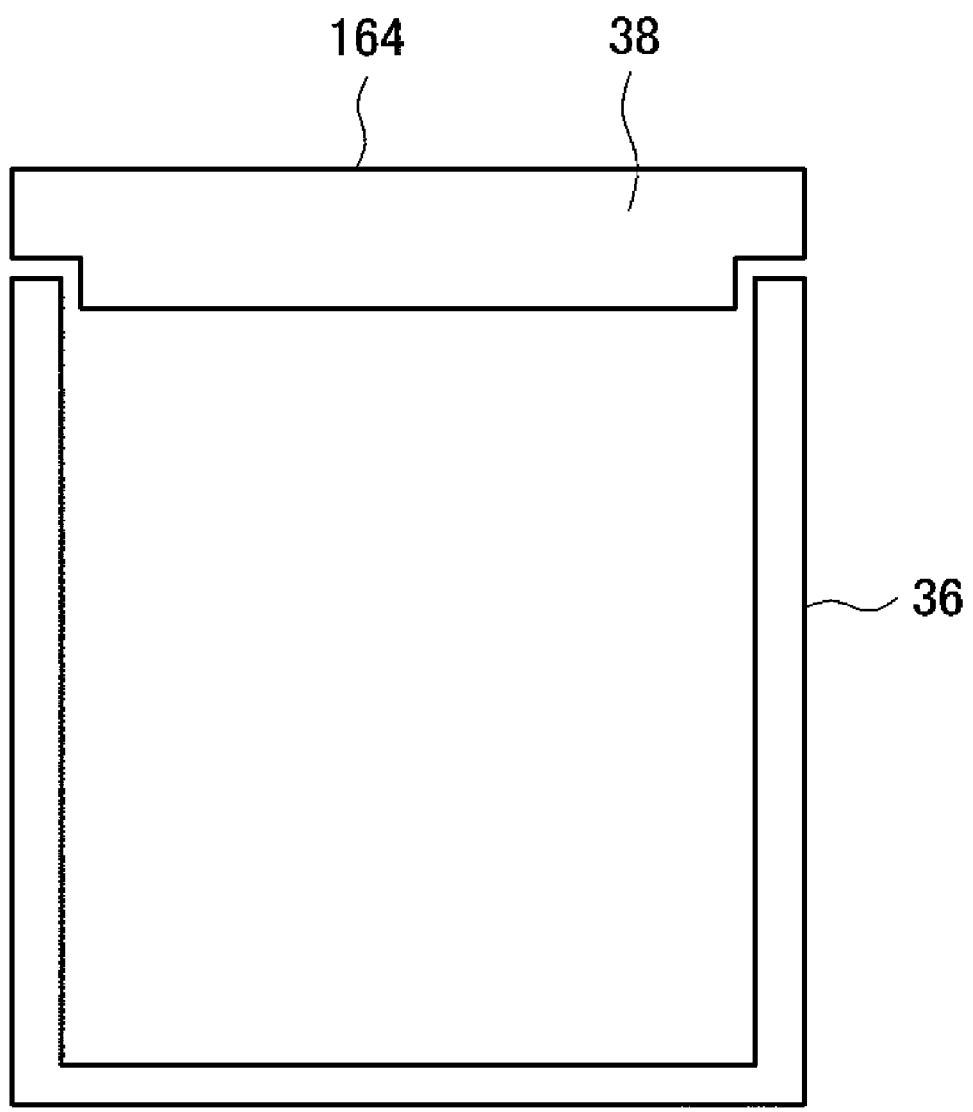
FIG. 18 shows the shape of a light shielding member.

FIG. 18 is a plan view showing the light shielding member 164. The light shielding member 164 forms a square frame. The light shielding member 164 is formed of a cut-off side 238 and the remaining three sides 236.

The light shielding member 164 can be formed only of a black light shielding layer. Since the black light shielding layer is black, it can absorb light and reduce reflection of light. Moreover, the black light shielding layer has conductivity because it is formed of a material containing carbon black. The light shielding member 164 is disposed above the wiring substrate 160 (opposite side from the light emitting diode 150). By disposing the light shielding member 164 above the wiring substrate 160, light exiting from the wiring substrate 160 can be blocked.

Since the wiring substrate 160 has a chromatic color, light transmitting through the wiring substrate 160 has a chromatic color. However, since the light shielding member 164 absorbs light, chromatic color light can be reduced. Therefore, it is possible to reduce the color non-uniformity of a backlight to realize uniform surface emission. When the light shielding member 164 is used for the cut-off side 238, and a two-sided adhesive tape is used for the other remaining three sides 236, an increase in cost for the material can be suppressed.

Figure 19:
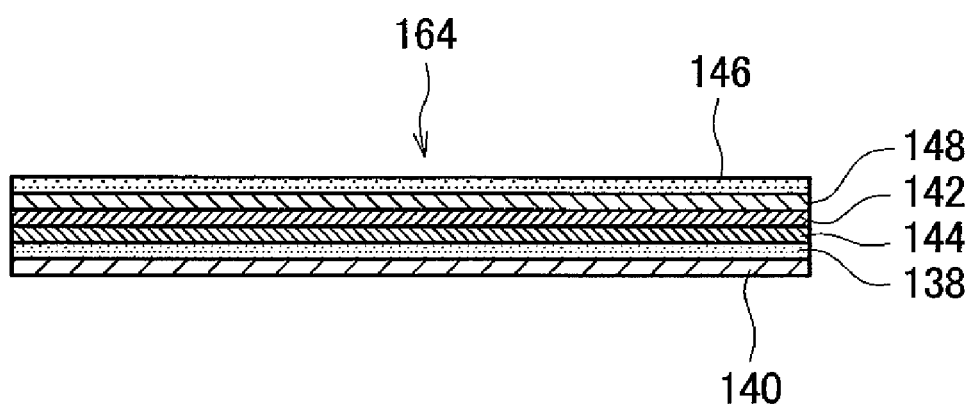
FIG. 19 shows the shape of a light shielding member.

The light shielding member 164 shown in FIG. 19 has a white light shielding layer 142 attached to a black light shielding layer 138 on the opposite side from an adhesive layer 140. A second adhesive layer 144 is interposed between the black light shielding layer 138 and the white light shielding layer 142 to bond them together. The light shielding member 164 has a second black light shielding layer 146 attached to the white light shielding layer 142 on the opposite side from the black light shielding layer 138. A third adhesive layer 148 is interposed between the white light shielding layer 142 and the second black light shielding layer 146 to bond them together.

According to the light shielding member 164 shown in FIG. 19, light transmitting through the black light shielding layer 138 can be blocked by the white light shielding layer 142. This can further prevent stray light from exiting upwardly from the light shielding member 164. Further, the second black light shielding layer 146 covers the white light shielding layer 142 to thereby prevent the white light shielding layer from being stained. Since the second black light shielding layer itself is black, stain is not noticeable.

Figure 20:
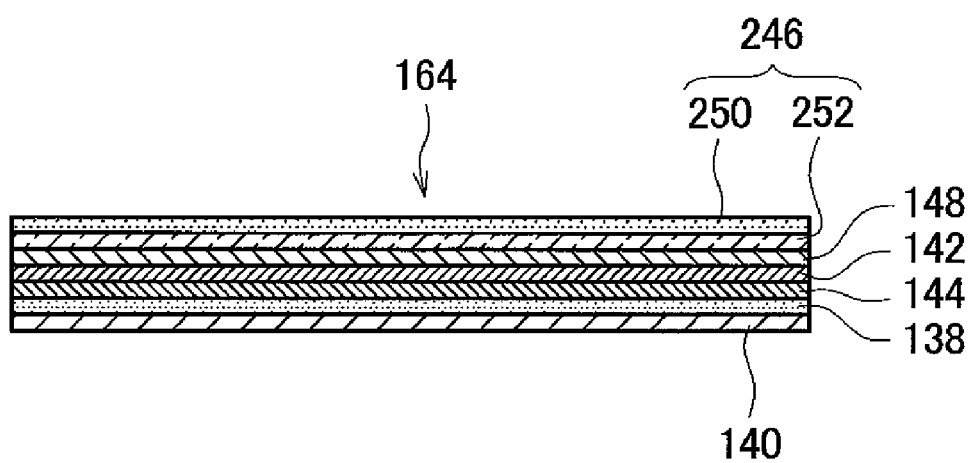
FIG. 20 shows the shape of a light shielding member.

In the light shielding member 164 shown in FIG. 20, a second black light shielding layer 246 includes a black resin layer 250 containing carbon black and a black print layer 252 formed of an ink containing carbon black.

What is claimed is:

1. A liquid crystal display device comprising:
    a liquid crystal panel having a liquid crystal layer interposed between a first substrate and a second substrate;
    a light guide plate disposed on a back face side of the liquid crystal panel, the light guide plate including
        a first projection and a second projection formed on a back face thereof,
        a reflection face interposed between the first projection and the second projection, and
        a light entering portion formed on a side face thereof; and
    a plurality of light sources formed so as to face the light entering portion, wherein
    the height of the side face is greater at a portion facing the light source and smaller at a portion interposed between the light sources.

2. A liquid crystal display device according to claim 1, wherein a padding is disposed at the portion interposed between the light sources.

3. A liquid crystal display device according to claim 1, wherein a padding is disposed at the portion interposed between the light sources, and the thickness of the padding is equal to the difference between the heights of the side face.

4. A liquid crystal display device according to claim 1, wherein a padding is disposed at the portion interposed between the light sources, and the padding is a two-sided adhesive tape.

5. A liquid crystal display device comprising:
    a liquid crystal panel having a liquid crystal layer interposed between a first substrate and a second substrate;
    a light guide plate made of a thermoplastic material and disposed on a back face side of the liquid crystal panel, the light guide plate including
        a first projection and a second projection formed on a back face thereof,
        a reflection face interposed between the first projection and the second projection, and
        a light entering portion formed on a side face thereof; and
    a plurality of light sources formed so as to face the light entering portion, wherein
    the height of the side face is greater at a portion facing the light source and smaller at a portion interposed between the light sources.

6. A liquid crystal display device according to claim 5, wherein a padding is disposed at the portion interposed between the light sources.

7. A liquid crystal display device according to claim 5, wherein a padding is disposed at the portion interposed between the light sources, and the thickness of the padding is equal to the difference between the heights of the side face.

8. A liquid crystal display device according to claim 5, wherein a padding is disposed at the portion interposed between the light sources, and the padding is a two-sided adhesive tape.

* * * * *